(12) United States Patent
Bertsch et al.

(10) Patent No.: US 9,543,768 B2
(45) Date of Patent: Jan. 10, 2017

(54) SAFETY DEVICE

(75) Inventors: Jochen Bertsch, Muehlacker-Grossglattbach (DE); Cornelius Liebenow, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 992 days.

(21) Appl. No.: 13/812,096

(22) PCT Filed: Jul. 25, 2011

(86) PCT No.: PCT/EP2011/062710
§ 371 (c)(1),
(2), (4) Date: May 28, 2013

(87) PCT Pub. No.: WO2012/013616
PCT Pub. Date: Feb. 2, 2012

(65) Prior Publication Data
US 2013/0234670 A1   Sep. 12, 2013

(30) Foreign Application Priority Data

Jul. 27, 2010  (DE) .................. 10 2010 038 460

(51) Int. Cl.
| | | |
|---|---|---|
| *H02J 7/00* | (2006.01) |
| *H01M 2/00* | (2006.01) |
| *H01M 10/50* | (2006.01) |
| *H01M 2/02* | (2006.01) |
| *B60R 21/017* | (2006.01) |
| *H01M 2/34* | (2006.01) |
| *H01M 10/44* | (2006.01) |
| *H01M 10/48* | (2006.01) |

(52) U.S. Cl.
CPC ......... *H02J 7/0029* (2013.01); *B60R 21/0173* (2013.01); *H01M 2/34* (2013.01); *H01M 2/345* (2013.01); *H01M 10/445* (2013.01); *H01M 10/48* (2013.01); *H02J 7/00* (2013.01); *H01M 2200/00* (2013.01); *H01M 2200/20* (2013.01)

(58) Field of Classification Search
CPC ...................................................... H02J 7/0029
USPC .. 320/107, 112, 127, 128, 135, 136; 429/61, 62, 170, 178, 179
See application file for complete search history.

(56) References Cited

U.S. PATENT DOCUMENTS

| | | | |
|---|---|---|---|
| 6,376,120 B1 * | 4/2002 | Azema .................. | H01M 2/345 429/57 |
| 7,713,651 B2 | 5/2010 | Leysieffer et al. | |
| 2003/0027036 A1 * | 2/2003 | Emori ..................... | H01M 2/34 429/61 |
| 2005/0255376 A1 | 11/2005 | Cho et al. | |

(Continued)

FOREIGN PATENT DOCUMENTS

| | | |
|---|---|---|
| CN | 101248546 A | 8/2008 |
| EP | 2 284 929 | 2/2011 |

(Continued)

OTHER PUBLICATIONS

International Search Report, International Application No. PCT/EP2011/062710, dated Oct. 7, 2011.

*Primary Examiner* — Richard V Muralidar
(74) *Attorney, Agent, or Firm* — Norton Rose Fulbright US LLP; Gerard Messina

(57) ABSTRACT

A safety device includes a discharge device for discharging an electric energy store in response to a deformation of the energy store, that is impending or has occurred.

21 Claims, 4 Drawing Sheets

(56) References Cited

U.S. PATENT DOCUMENTS

2006/0257729 A1\* 11/2006 Lee .................. H01M 2/04
429/174

FOREIGN PATENT DOCUMENTS

| JP | 11-191436 | 7/1999 |
| JP | 2001-243-991 | 9/2001 |
| JP | 2002 231319 | 8/2002 |
| JP | 2004 319463 | 11/2004 |
| JP | 2007-533-100 | 11/2007 |

\* cited by examiner

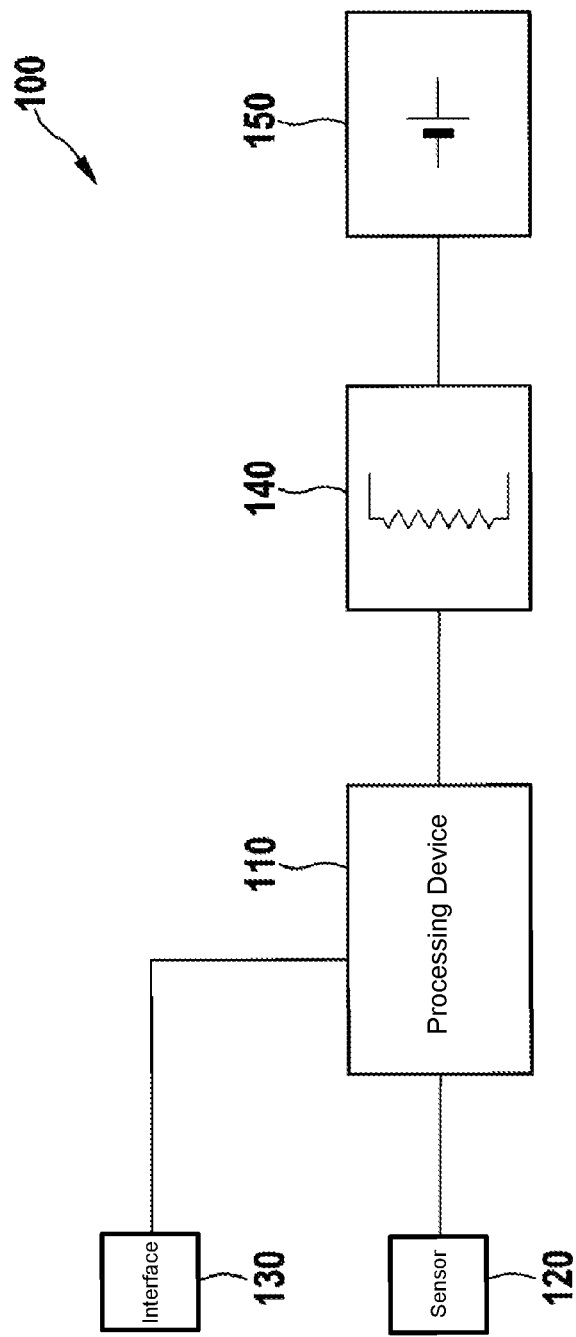

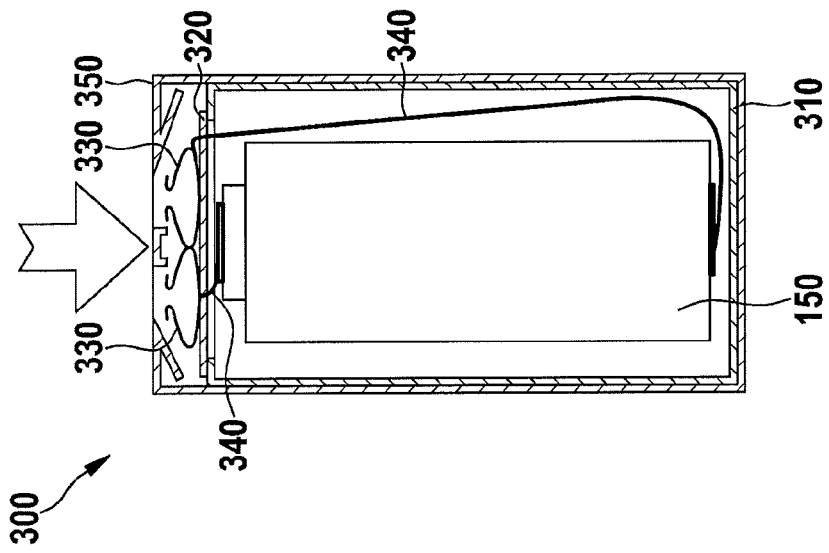
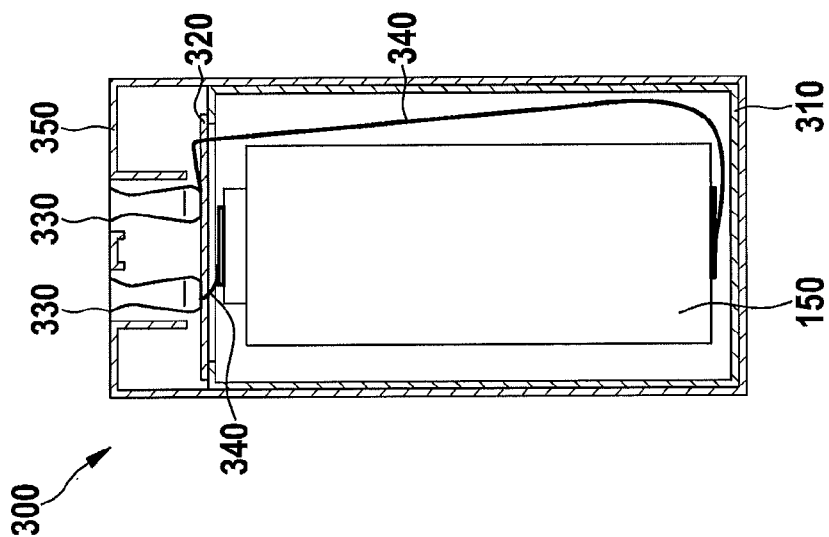

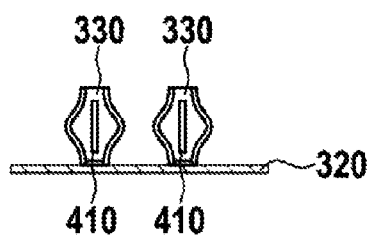 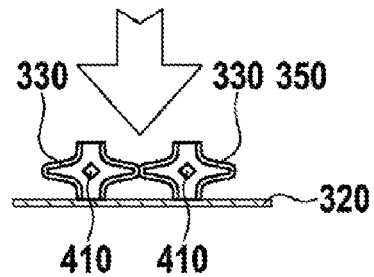
Fig. 4a        Fig. 4b
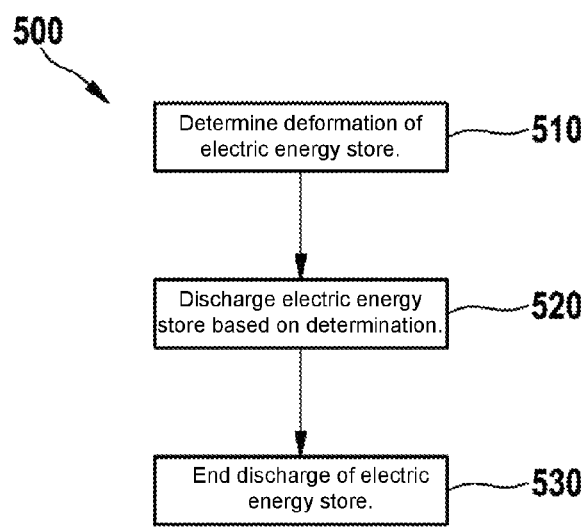
Fig. 5

SAFETY DEVICE

BACKGROUND INFORMATION

Batteries for electrochemical storage frequently contain aggressive substances which, when set free, may lead to the endangerment of persons and objects. In some energy stores, for instance, in the case of lithium ions ("Li ion"), there is the additional danger of fire and/or explosion, since the electrolyte used is combustible. As a result, conventional batteries and capacitors are constructed in such a way that they are able to withstand the mechanical stresses that are to be expected, without a jacket of the battery being injured, so that transition of the dangerous substances into the surroundings of the energy store is prevented.

In spite of this, damage to the jacket is never quite to be excluded. In the field of motor vehicles, for example, in which a battery may be used for supplying the vehicle electrical system or for driving something, in case of an accident, even a well secured battery may be greatly deformed and may burst open. The ignition of the exiting electrolyte may take place during the deformation or later, quite possibly even after several seconds or minutes.

An object of the present invention is to provide a safety device and a safety measure for the protection of persons and material from an energy store that is damaged by deformation.

SUMMARY

The danger of fire and explosion of energy stores such as batteries and capacitors, or rather of their electrolytes, is a function of the charging state of the energy store. Investigations have shown that damage as a result of deformation by fire and explosion may in many cases be avoided by merely reducing the charging state of the energy store by a small proportion during the liberation of the electrolyte.

According to an example embodiment of the present invention, a safety device is used having a discharge device for discharging an electric energy store in response to a deformation of the energy store, that is impending or has occurred. As a function of a deformation speed and a maximum capacity of the battery, as well as perhaps a prewarning time up to the probable deformation of the battery, one may thus succeed in reducing the state of charge of the battery in time by a decisive proportion so that a fire and/or an explosion by exiting electrolyte are able to be avoided.

In a first variant of the present invention, the safety device includes a determination device for determining a deformation, that is impending or has occurred, of the energy store, and a discharging device for discharging the energy store as a function of the determination result. The determination device may advantageously be connected to a sensor or a processing device in the surroundings of the battery, in order to increase the quality of the determination. In a motor vehicle, for instance, a signal of a safety system that points to a collision ("pre-crash") may be received. Alternatively or additionally, sensor values may be picked up on the basis of which an impending deformation of the energy store is determined by the determination device.

In one specific embodiment, the determination device is designed to determine a deformation speed of the energy store, the discharge device being equipped to discharge the energy store as a function of the determined deformation speed. If the existing or the imminent deformation speed is high, the discharge speed of the energy store may also be high, for example.

In a similar manner, the determination device may be designed to determine a deformation speed of the energy store, the discharge device being equipped to discharge the energy store as a function of the determined deformation speed. If the existing or the impending degree of deformation is high, the discharge speed of the energy store may also be high.

In a second variant of the present invention, which is able to be combined with the first variant, a first and a second electrical contact element may be mounted next to each other on the energy store. The first contact element is equipped to expand radially in response to axial compression, so that a conducting connection is created to the second contact element. Such a specific embodiment is able to be produced simply and cost-effectively. Because of the purely mechanical implementation, a very high reliability of the safety device may be achieved.

The first contact element may have the shape of a necking or a bulging hollow cylinder, in order to favor the radial expansion in response to axial deformation. Furthermore, the first contact element may have an axial slit. The slit may, in particular, run in a direction which is perpendicular to a direction in which the second contact element is situated. The slit is able to make it possible that a section of the first contact element, which faces the second contact element, is able to be deformed more easily, in response to an axial deformation, in the direction of the second contact element.

The second contact element is preferably also deformable in a corresponding fashion, so that the contact elements produce a good electrical contact to each other in response to a deformation.

The discharge device may be equipped to convert electrical energy to thermal energy. A thermal mass may be provided which is connected in a thermally conductive manner to the discharge device. The thermal mass may change its state of aggregation by taking up heat energy. Thus, a large quantity of heat may be able to be dissipated within a short period of time. The discharging speed of the safety device may thereby be increased and danger based on a greatly heated discharge device may be minimized.

A safety method for discharging an electrical energy store includes steps of determining a deformation, that is impending or has occurred, of the energy store, and the discharging of the energy store as a function of the determination result.

Parts of the method, particularly for determining an impending deformation of the energy store, may be developed within the scope of a functionality, which is available anyway in the surroundings of the electrical energy store. This functionality may be, in particular an energy management system of the energy store.

The method may run as a computer program product, having program code, on a processing device or may be stored on a computer-readable data carrier.

BRIEF DESCRIPTION OF THE DRAWINGS

The present invention is described below with reference to the figures.

FIG. 1 shows a block diagram of a safety device.

FIG. 3 shows a mechanical safety device.

FIG. 4 shows an alternative specific embodiment of the contact elements of the safety device from FIG. 4.

FIG. 5 shows a flow chart for a method for controlling the safety device from FIG. 4.

DETAILED DESCRIPTION OF EXAMPLE EMBODIMENTS

Figure 2A:
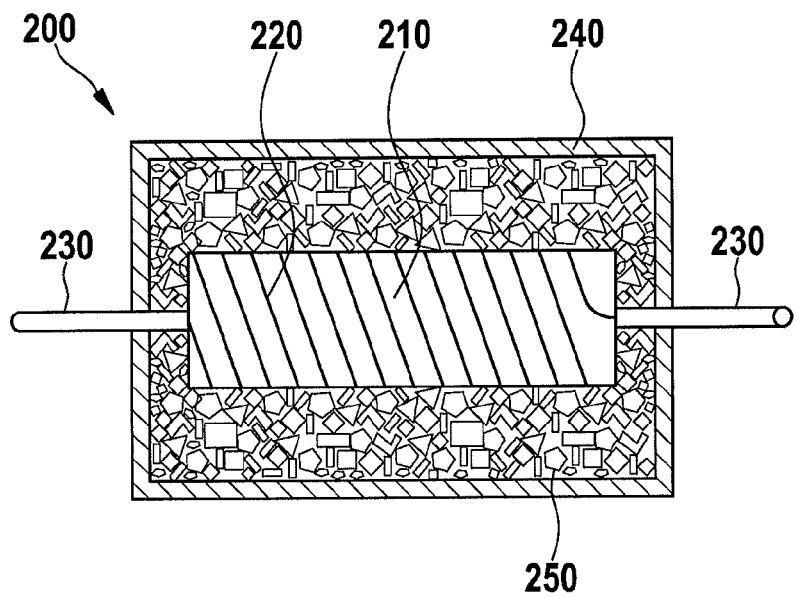
FIG. 2 shows a resistor of the safety device from FIG. 1.

FIG. 1 shows a safety device 100 as a block diagram. A processing device 110 is connected to a sensor 120. Processing device 110 is preferably an electronic processing device in the form of a microcomputer, but it may also be developed as a fixed wired logic.

Sensor 120 is usually situated on energy store 150 or in its immediate vicinity. Sensor 120 is able to pick up one or more physical variables which point to a deformation of energy store 150, that has occurred or is impending, for example, an expansion, a compression, a force, an acceleration or a vibration. In additional specific embodiments, several of these variables may also be combined or scanned by several sensors 120 and provided to processing device 110.

Processing device 110 is also connected to an interface 130, via which additional sensor values and/or determination results are exchangeable with other components. When safety device 100 is used in a motor vehicle, processing device 110 may be connected to one or more control systems of the motor vehicle via interface 130.

In addition, processing device 110 is connected to a discharge device 140, which is equipped to remove electrical energy from an energy store 150. Energy store 150 may be a component of safety device 100 or a separate component. In both cases, other elements of safety device 100, particularly processing device 110 may be situated in the immediate vicinity of, or even within energy storage 150.

Energy store 150 is usually an electrochemical energy store, for instance, a lithium ion battery, a nickel metal hydride ("NiMh") battery or a double layer capacitor. A tendency of energy store 150, to explode or catch on fire, in response to a deformation or an exiting of electrolyte caused in another way, is a function of a state of charge of energy store 150. The higher the state of charge of energy store 150, the greater is the danger of an explosion or a fire.

Discharge device 140 is connected to energy store 150 in an electrically conductive manner. In order to be able to remove a large quantity of electrical energy safely from energy store 150 within a short period of time, high-performance electrical connections having large cross sections are preferred, such as in the form of braided copper cables. Discharge device 140 includes a switch, by which the removal of electrical energy from energy store 150 is able to be controlled. The switch may include, for example, one or more transistors, such as field effect transistors ("FET"). A conventional switch may also be provided, having perhaps magnetic, hydraulic or pneumatic operation. Discharge device 140 converts the electrical energy removed from energy store 150 into another form of energy, preferably into heat. In other specific embodiments, the energy removed may also be used in other ways, such as for charging another energy store such as a lead battery.

Figure 2B:
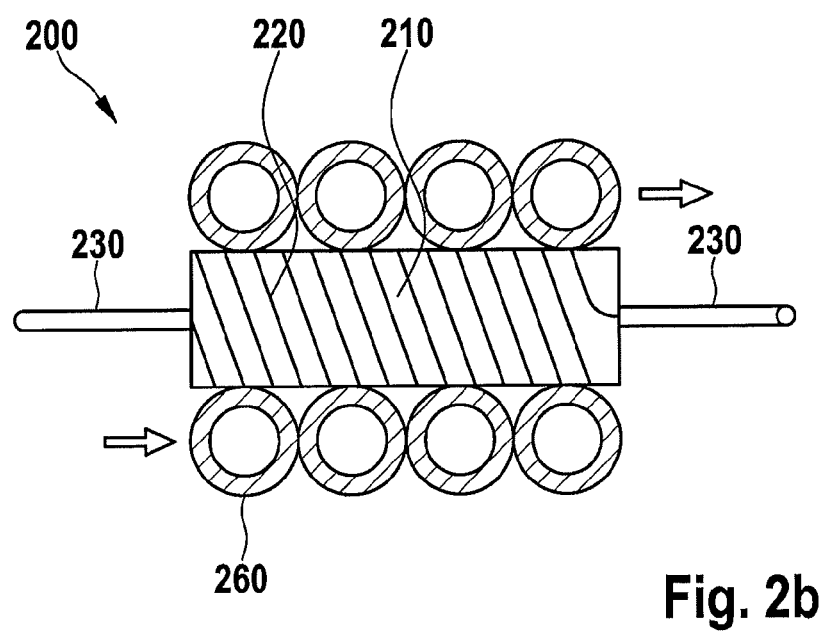

FIGS. 2A and 2B show different specific embodiments of a resistor 200 for converting electrical energy to thermal energy within discharge device 140 as in FIG. 1. An insulating body 210 is encircled multiple times by a resistance wire 220, that is connected to electric terminals 230. Insulating body 210 supports the windings of resistance wires 220 and is preferably made of a ceramic material having a high thermal conduction value. In other specific embodiments, insulating body 210 may also be omitted.

In FIG. 2A, resistor 200 also includes a housing 240, which accommodates insulating body 210, resistance wire 220 and a salt granulate 250. Under the influence of heat, salt granulate 250 changes its state of aggregation from solid to liquid, salt granulate 250 absorbing large quantities of heat energy. When current flows through resistance wire 220, the latter heats up and, as a result, salt granulate 250 heats up too. At a specific temperature, salt granulate 250 changes its state of aggregation from solid to liquid, whereupon it absorbs significant quantities of thermal energy, so that resistance wire 220 is cooled. An apparatus may be provided for running off liquified salt granulate 250, so that resistance wire 220 may be surrounded by additional solid salt granulate 250.

In other specific embodiments, a different thermal mass may also be used as salt granulate 250 which, under influence of heat of resistance wire 220 changes its state of aggregation or its phase, perhaps from solid to liquid and/or from liquid to gaseous.

FIG. 2B shows a variant of resistor 200 of FIG. 2A. Insulating body 210, resistance wire 220 and electric terminals 230 are developed as in FIG. 2A, but instead of housing 240 having salt granulate 250 from FIG. 2A, a hose or tube system 260 is provided for cooling resistance wire 220 using liquid. Tube system 260 encircles insulating body 210, having resistance wire 220, several times, and the liquid flows through tube system 260. The liquid may be a component of the liquid cooling system of a motor vehicle, in which safety system 100 from FIG. 1 is installed. In another specific embodiment, insulating body 210 and resistance wire 220 may also have cooling fluid flowing directly around them. For this, insulating body 210 and resistance wire 220 may be situated within tube system 260.

Resistor 200 is preferably situated in such a way that the heat created at it is able to be given off to the surroundings, for instance, to parts of the motor vehicle. These parts may include, for example, the body of the car, parts of the chassis or an engine block. In one additional specific embodiment, resistor 200 is formed by a current circuit through these parts.

In a further preferred manner, the giving off of heat through resistor 200 takes place in such a way that energy store 150 is not substantially heated by it. This may be implemented, for example, by providing a certain minimum distance between resistor 200 and energy store 150. Alternatively to this, a thermal insulating body may also be provided between resistor 200 and energy store 150.

FIG. 3 shows a vertical section through a mechanical safety device 300, in FIG. 3A an intact safety device 300 being represented, and in FIG. 3B a safety device 300 that is deformed in the vertical direction.

In a housing 310, energy store 150 is accommodated in the form of a cylindrical lithium ion battery. On the upper side, housing 310 is closed by a cover plate 320. At cover plate 320, two contact elements 330 are situated next to each other and, using electrical lines 340, are connected electrically to a plus pole and a minus pole, respectively, of energy store 150. An optional cover 350 closes safety device 300 in such a way from the upwards direction that contact elements 330 remain accessible for connecting consumers from above, but remain covered in the lateral direction.

Each of contact elements 330 has the shape of a hollow cylinder closed on the lower side, which demonstrates necking at about two-thirds of its height. In one specific alternative embodiment, contact elements 330 may also be formed as a flat component, such as a sheet metal strip, the sectional areas shown being generally maintained.

If safety device 300 is compressed in the vertical direction, contact elements are deformed in such a way that they become flatter and wider, whereby outer limitations of contact elements 330 move towards each other until they make electrical contact with each other. The cover 350 is deformed in response to the deformation in an optional manner, and in this context, the destruction of cover 350 has to be accepted. One should only pay attention that no component of cover 350 gets into the region between contact elements 330, so that the contact between contact elements 330 remains unimpaired. Because of the contact closure, an electric current flows between contact elements 330, which heats contact elements 330. Contact elements 330 function in this case both as determination device that a deformation of energy store 300 has occurred, and as discharge device for converting electrical energy of energy store 150 to thermal energy. Cover plate 320 may be designed to be heat insulating, in order to screen energy store 150 from the heat that accurs.

FIG. 4 shows an alternative specific embodiment of contact elements 330 of safety device 300 from FIG. 3. For simplified reference, cover plate 320 is shown in addition. FIG. 4A shows intact contact elements 330, and FIG. 4B shows vertically compressed contact elements 330.

Contact elements 330 are each shown in longitudinal section and have a shape which arises from a hollow cylinder closed at the bottom. Between an upper and a lower end, contact elements 330 have a bulge in the radial direction, whereby they demonstrate a bulgy shape. In FIG. 4A, slits 410 run vertically in the longitudinal direction of contact elements 330, analogously to FIGS. 3A and 3B.

Slits 410 are applied to contact elements 330 in such a way that, in the deformation shown in FIG. 4B, of contact elements 330 in the vertical direction, a broadening of contact elements 330 in the direction towards each other is made easier. In the deformation, slits 410 may assume the rhombus shape shown. With reference to a vertical longitudinal axis of contact element 330, slits 410 are preferably pairwise opposite to each other, and in a region of each contact element 330, which points in the direction of the respectively other contact element 330, preferably no slit 410 is inserted.

FIG. 5 shows a flow chart for a method 500 for controlling the safety device 100 from FIG. 1. Method 500 may, for example run on processing device 110 of safety device 100 of FIG. 1. In an abstract manner, method 500 may also be applied to safety device 300 of FIG. 3. In the following, we shall, however, go particularly into a use in connection with safety device 100 of FIG. 1.

Method 500 includes steps 510 to 530. In first step 510, a deformation of energy store 150, that is impending or has occurred, is determined. An impending deformation may be determined, for instance, when an acceleration in the region of energy store 150 is particularly large or particularly small, or when a safety function in the surroundings of energy store 150 is triggered, for instance, a belt tensioner, an air bag, a seat adjustment or another safety device of a motor vehicle for minimizing damage by an impact.

As a function of the determination result from step 510, energy store 150 is discharged in step 520. The discharge may be carried out as a function of attendant circumstances of the deformation, in particular, a speed and a degree of discharge may be a function of an expected time until the deformation occurs, the speed of a deformation that is impending or has occurred and/or a degree of deformation that is impending or has occurred. Additional parameters may also be evaluated, such as a state of charge of energy store 150. If energy store 150 is charged, for example, in the range between ⅔ and fully, the discharge speed and/or the discharge degree may be higher than when the energy store is charged to less than ⅔ of its maximum capacity.

Discharging is ended in optional step 530. Step 530 may be executed after a predetermined deformation in the form of a predetermined deformation degree has occurred, a predetermined degree of charge of energy store 150 and/or a predetermined degree of discharge of energy store 150 have been reached. Step 530 may also be a function of additional parameters.

What is claimed is:

1. A safety device, comprising:
a determination device to determine that deformation of an electric energy store has occurred, the determination device including first and second contact elements mounted side by side on the electric energy store, the first contact element being configured to expand radially in a direction of the second contact element in response to axial compression to create a conducting connection between the first and second contact elements; and
a discharge device to discharge the electric energy store in response to the determined deformation of the electric energy store.

2. The safety device as recited in claim 1, wherein the discharge device discharges the energy store as a function of a determination result by the determination device.

3. The safety device as recited in claim 2, wherein the determination device is configured to determine a deformation speed of the electric energy store, and the discharge device is equipped to discharge the electric energy store as a function of the determined deformation speed.

4. The safety device as recited in claim 2, wherein the determination device is configured to determine a degree of deformation of the electric energy store, and the discharge device is equipped to discharge the electric energy store as a function of the determined degree of deformation.

5. The safety device as recited in claim 1, wherein the first contact element has a shape of a hollow cylinder that includes at least one of: necking, or bulging.

6. The safety device as recited in claim 1, wherein the first contact element includes an axial slit running in a longitudinal direction substantially perpendicular to the direction of radial expansion.

7. The safety device as recited in claim 1, wherein the discharge device is equipped to convert electric energy to thermal energy.

8. The safety device as recited in claim 7, wherein the discharge device includes a thermal mass which changes its state of aggregation while absorbing thermal energy.

9. The safety device as recited in claim 1, wherein the first and second contact elements are situated side by side along the direction of radial expansion.

10. The safety device as recited in claim 1, wherein the discharge device includes a circuit having the first and second contact elements and at least one electrical line connecting the first and second contact elements to poles of the electric energy store.

11. The safety device as recited in claim 1, wherein the first contact element includes a metal strip including at least one of: necking, or bulging.

12. The safety device as recited in claim 1, wherein the first contact element includes a pair of axial slits, running in a longitudinal direction substantially perpendicular to the direction of radial expansion, arranged opposite each other and on a portion of the first contact element facing in a direction other than toward the second contact element.

13. A method for safely discharging an electric energy store, the method comprising:
   determining a deformation of the electric energy store, the determining including a first contact element, mounted side by side on the electric energy store with a second contact element, expanding radially in a direction of the second contact element in response to axial compression to create a conducting connection between the first and second contact elements; and
   discharging, using a discharge device, the electric energy store as a function of the determining.

14. The method as recited in claim 13, wherein the first contact element has a shape of a hollow cylinder that includes at least one of: necking, or bulging.

15. The method as recited in claim 13, wherein the first contact element includes a metal strip including at least one of: necking, or bulging.

16. The method as recited in claim 13, wherein the first contact element includes an axial slit running in a longitudinal direction substantially perpendicular to the direction of radial expansion.

17. The method as recited in claim 13, further comprising converting, by the discharge device, electric energy to thermal energy.

18. The method as recited in claim 17, wherein the discharge device includes a thermal mass which changes its state of aggregation while absorbing thermal energy.

19. The method as recited in claim 13, wherein the first and second contact elements are situated side by side along the direction of radial expansion.

20. The method as recited in claim 13, wherein the discharge device includes a circuit having the first and second contact elements and at least one electrical line connecting the first and second contact elements to poles of the electric energy store.

21. A non-transitory machine-readable storage medium having program instructions, which when executed by a processing device perform a method of safely discharging an electric energy store, the method comprising:
   determining a deformation of the electric energy store, the determining including a first contact element, mounted side by side on the electric energy store with a second contact element, expanding radially in a direction of the second contact element in response to axial compression to create a conducting connection between the first and second contact elements; and
   discharging, using a discharge device, the electric energy store as a function of the determining.

* * * * *